(12) United States Patent
Sherman (10) Patent No.: US 11,211,057 B2
(45) Date of Patent: Dec. 28, 2021

(54) INTERACTIVE E-READER DEVICE, RELATED METHOD, AND COMPUTER READABLE MEDIUM STORING RELATED SOFTWARE PROGRAM

(71) Applicant: Perry Sherman, New York, NY (US)

(72) Inventor: Perry Sherman, New York, NY (US)

( * ) Notice: Subject to any disclaimer, the term of this patent is extended or adjusted under 35 U.S.C. 154(b) by 224 days.

(21) Appl. No.: 16/386,957

(22) Filed: Apr. 17, 2019

(65) Prior Publication Data

US 2019/0318728 A1    Oct. 17, 2019

Related U.S. Application Data

(60) Provisional application No. 62/658,728, filed on Apr. 17, 2018.

(51) Int. Cl.
*G06F 3/16*        (2006.01)
*G10L 15/187*      (2013.01)
*G06F 3/0482*      (2013.01)
*G06F 3/0483*      (2013.01)
*G06F 40/109*      (2020.01)
*G06F 40/166*      (2020.01)
*G06F 40/205*      (2020.01)
*G06F 40/279*      (2020.01)
*G10L 15/08*       (2006.01)
*G10L 15/20*       (2006.01)
*G10L 15/26*       (2006.01)

(52) U.S. Cl.
CPC .......... *G10L 15/187* (2013.01); *G06F 3/0482* (2013.01); *G06F 3/0483* (2013.01); *G06F 3/167* (2013.01); *G06F 40/109* (2020.01); *G06F 40/166* (2020.01); *G06F 40/205* (2020.01); *G06F 40/279* (2020.01); *G10L 15/20* (2013.01); *G10L 15/26* (2013.01); *G10L 2015/088* (2013.01)

(58) Field of Classification Search
CPC .......... G10L 15/26; G10L 15/20; G06F 3/167
See application file for complete search history.

(56) References Cited

U.S. PATENT DOCUMENTS 6,424,357 B1 *   7/2002   Frulla ................... G06F 3/038
                                                        715/716
8,286,885 B1 *  10/2012   Zehr .................... G06F 3/0485
                                                        235/492

(Continued)

*Primary Examiner* — Feng-Tzer Tzeng
(74) *Attorney, Agent, or Firm* — Venable LLP (57) ABSTRACT

A device interacts with a user by receiving an audio voice input from the user via a microphone, processing the received audio voice input, including determining whether the received audio voice input sufficiently phonetically matches with one or more stored words associated with a page being displayed on a display screen, controlling, if the received audio voice input does not sufficiently phonetically match the one or more stored words associated with the page being displayed on the display screen, at least one of a speaker to emit audio that provides audio assistance to the user, and the display screen to display a screen that provides visual assistance to the user, and controlling, if the received audio voice input does sufficiently phonetically match the one or more stored words associated with the page being displayed on the display screen, the display screen to display a screen indicating the sufficient phonetic match.

19 Claims, 8 Drawing Sheets

(56) References Cited

U.S. PATENT DOCUMENTS

| | | | |
|---|---|---|---|
| 8,434,001 B2 * | 4/2013 | Kandekar | G06F 40/169 715/234 |
| 10,249,205 B2 | 4/2019 | Hammersley et al. | |
| 2001/0003173 A1 * | 6/2001 | Lim | G10L 15/20 704/239 |
| 2010/0312547 A1 * | 12/2010 | Van Os | G06F 3/167 704/9 |

* cited by examiner

INTERACTIVE E-READER DEVICE, RELATED METHOD, AND COMPUTER READABLE MEDIUM STORING RELATED SOFTWARE PROGRAM

CROSS REFERENCE TO RELATED APPLICATION

This application claims the benefit under 35 U.S.C. § 119(e) of U.S. Provisional Patent Application No. 62/658,728, filed Apr. 17, 2018, and titled "Living Book Company," the entirety of which is incorporated herein by reference.

FIELD OF THE INVENTION

This invention relates to a voice activation software tool usable with an electronic book (e-book), and a related software program. More specifically, this invention relates to an electronic device for viewing and playing back of media content, triggered by voice activation tools, a method for voice activation on the electronic device, and a method for displaying animations, including words and images, on the electronic device.

BACKGROUND OF THE INVENTION

Advancements in technology have resulted in more widespread use of electronic readers (e-readers), smartphones, and tablets, and have greatly improved the reading experience on such devices in recent years. Particularly in the academic field, reading on e-readers (e-reading) has led to significant development in how a user learns and consumes the content through use of the e-reader.

For example, popular e-readers, including Kindle®, a product of Amazon Technologies, Inc., of Seattle, Wash., LeapFrog® tablets, a product of LeapFrog Enterprises Inc., of Emeryville, Calif., and iPad®, a product of Apple Inc., of Cupertino, Calif., are often used for e-reading.

Also, advancements in technology have resulted in more widespread use of voice recognition tools. Voice recognition technology has not yet been incorporated into e-readers, such as those noted above, in a manner that creates an interactive experience while maintaining a focus on reading. Incorporating voice recognition technology into an e-reader may be particularly useful in developing educational materials, especially for children who are learning to read and to make connections between things they see in their everyday life and words on the screens of their e-readers.

SUMMARY OF THE INVENTION

In one aspect, the invention provides a device comprising a housing, a display including a display screen, a user input interface, a speaker, a microphone, at least one memory that stores instructions and media content, and at least one processor that, when executing the instructions stored in the at least one memory, is configured to display a list, including the media content stored in the at least one memory, on the display screen, receive, from a user, a selection of media content from the displayed list of media content, retrieve the selected media content from the at least one memory upon receipt of the selection from the user, display the selected media content on the display screen as one or more pages of the media content, receive, from the user, an input command via the user input interface, execute a command in response to receiving the input command from the user, and perform an interaction with the user that includes receiving an audio voice input from the user via the microphone, processing the received audio voice input, including determining whether the received audio voice input sufficiently phonetically matches with one or more stored words associated with the page being displayed on the display screen, controlling, if the received audio voice input does not sufficiently phonetically match the one or more stored words associated with the page being displayed on the display screen, at least one of the speaker to emit audio that provides audio assistance to the user, and the display screen to display a screen that provides visual assistance to the user, and controlling, if the received audio voice input does sufficiently phonetically match the one or more stored words associated with the page being displayed on the display screen, the display screen to display a screen indicating the sufficient phonetic match.

In another aspect, the invention provides a non-transitory computer-readable storage medium storing a program that, when executed by a processor in a device, performs a method comprising displaying, in a display screen of the device, a list, including media content stored in at least one memory of the device, receiving, via a user input interface of the device, a selection of media content from the displayed list of media content, retrieving the selected media content from the at least one memory upon receipt of the selection from the user, displaying the selected media content on the display screen as one or more pages of the media content, receiving, from the user, an input command via the user input interface, executing a command in response to receiving the input command from the user, and performing an interaction with the user that includes receiving an audio voice input from the user via a microphone of the device, processing the received audio voice input, including determining whether the received audio voice input sufficiently phonetically matches with one or more stored words associated with the page being displayed on the display screen, controlling, if the received audio voice input does not sufficiently phonetically match the one or more stored words associated with the page being displayed on the display screen, at least one of the speaker to emit audio that provides audio assistance to the user, and the display screen to display a screen that provides visual assistance to the user and controlling, if the received audio voice input does sufficiently phonetically match the one or more stored words associated with the page being displayed on the display screen, the display screen to display a screen indicating the sufficient phonetic match.

In still another aspect, the invention provides a method comprising displaying, in a display screen of the device, a list, including media content stored in at least one memory of the device, receiving, via a user input interface of the device, a selection of media content from the displayed list of media content, retrieving the selected media content from the at least one memory upon receipt of the selection from the user, displaying the selected media content on the display screen as one or more pages of the media content, receiving, from the user, an input command via the user input interface, executing a command in response to receiving the input comment from the user, and performing an interaction with the user that includes receiving an audio voice input from the user via a microphone of the device, processing the received audio voice input, including determining whether the received audio voice input sufficiently phonetically matches with one or more stored words associated with the page being displayed on the display screen, controlling, if the received audio voice input does not sufficiently phonetically match the one or more stored words associated with the page being displayed on the display screen, at least one of the speaker to emit audio that provides audio assistance to the user, and the display screen to display a screen that provides visual assistance to the user, and controlling, if the received audio voice input does sufficiently phonetically match the one or more stored words associated with the page being displayed on the display screen, the display screen to display a screen indicating the sufficient phonetic match.

These and other aspects of the inventions will become apparent from the following description and the accompanying drawings.

DETAILED DESCRIPTION OF THE PREFERRED EMBODIMENTS

Figure 1:
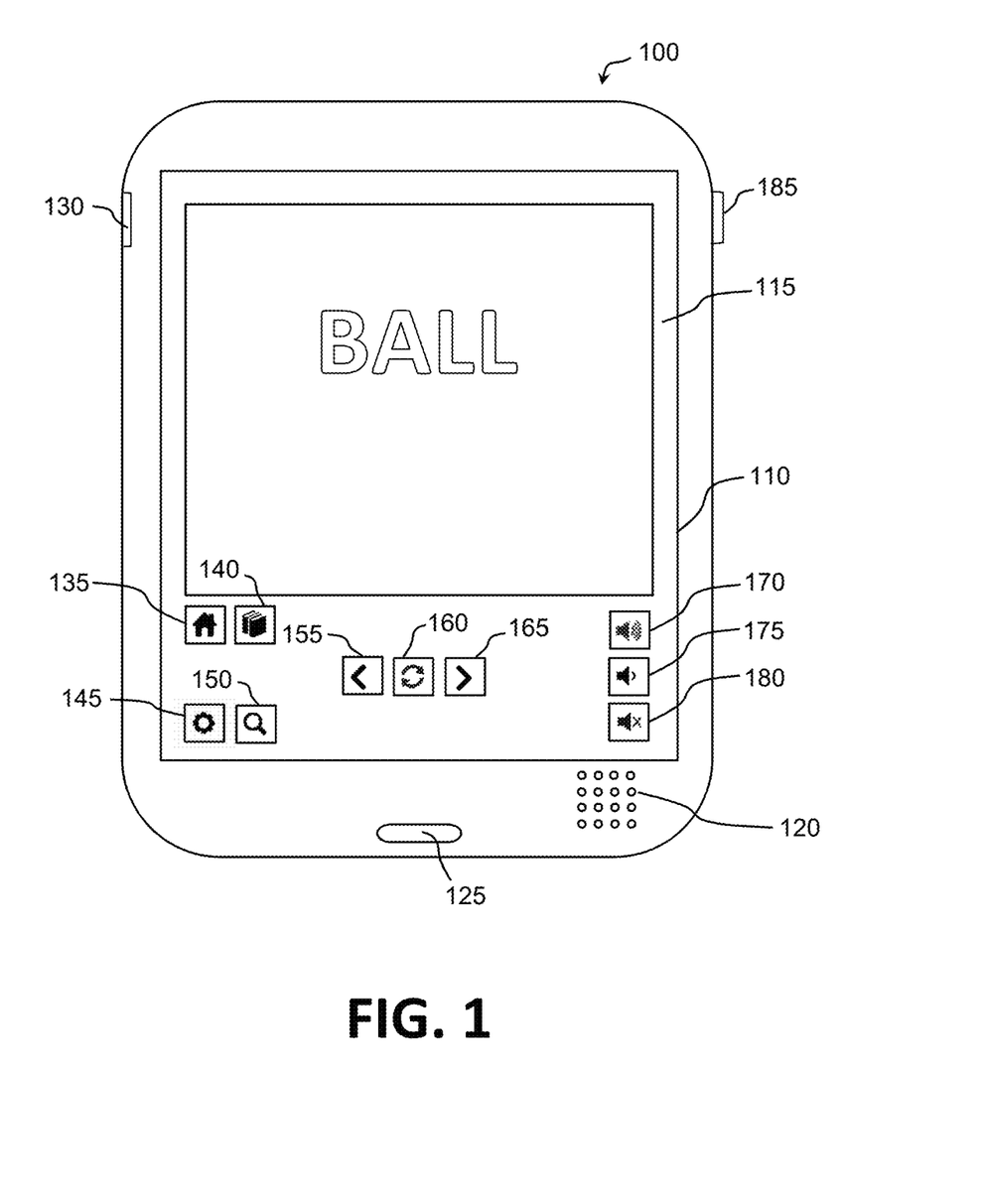
FIG. 1 shows an interactive electronic reader (e-reader) device according to a preferred embodiment of the invention.

FIG. 1 shows an example of an interactive electronic reader (e-reader) device 100 of the present invention. The e-reader device stores various media content, including, for example, electronic books (e-books), and that allows a user to view and to playback the various media content stored thereon. The e-books may include, for example, text, photos, videos, and audio. The e-reader device 100 is preferably portable and handheld, so as to be transported and operated with one or two hands. The e-reader device 100 includes a housing 105, a user input interface (I/F) 110, a touch screen display 115, which may constitute a part of the user input I/F 110, a speaker 120, a microphone 125, and an interface port 130.

The touch screen display 115 is preferably a backlit, wide-angle, touch-sensitive liquid crystal display (LCD) or organic light-emitting diode (LED) screen. It is recognized that the touch screen display 115 may be implemented using any suitable display size, resolution, and technology, including those without touch-sensitive functionality.

The user input I/F 110 includes various buttons, which, on the touch screen display 115, are displayed as icons, such as a home button 135, a library button 140, a settings button 145, a search button 150, a previous page button 155, a repeat button 160, a next page button 165, a volume up button 170, a volume down button 175, a mute button 180, a power on/off button 185. The various buttons, as well as a page 190 of media content selected by a user, are displayed on the touch screen display 115. Of course, it is recognized that the buttons shown in FIG. 1 are merely one example of button configuration for the user input I/F 110. Indeed, any configuration of buttons may be used with e-reader device 100. Moreover, the user input I/F 110 may even incorporate alternative or additional interface types, including one or more of buttons, rotatable dials, touch pads, etc., and any combination thereof, that are separate from the touch screen display 115.

The microphone 125 is built-in to the e-reader device 100, and, more specifically, is supported within the housing 105. The microphone 125 is preferably a microelectro-mechanical system (MEMS) type microphone, although the microphone 125 may be another type of microphone suitable for use in an e-reader device. The microphone 125 is configured to receive voice commands, in the form of sound waves generated by a user when the user speaks, and to output an electrical signal to a central processing unit (CPU), described below, for processing. The e-reader device 100 is configured to request permission, upon power on of the e-reader device, for use of the microphone 125 by the user. That is, the microphone 125 can only be used when the e-reader device 100 is turned on and the user has authorized use of the microphone 125. The microphone 125 serves as an input element for speech recognition, described below.

The speaker 120 is used to output sound for videos, animations, and audio content. The speaker 120 may also be used for audio prompts as part of an interactive process performed by the e-reader device 100. As will be described below, if displayed media content includes an audio file corresponding to a displayed page of the e-book, a central processing unit (CPU) 195 outputs an audio signal corresponding to the audio file to the speaker 120. For example, if the audio file contains a voice recording of the word "ball," the CPU 195 may output the voice recording so that the user can hear the voice recording through the speaker 120. The audio file may contain other types of information, such as music, sound effects, etc.

Figure 2:
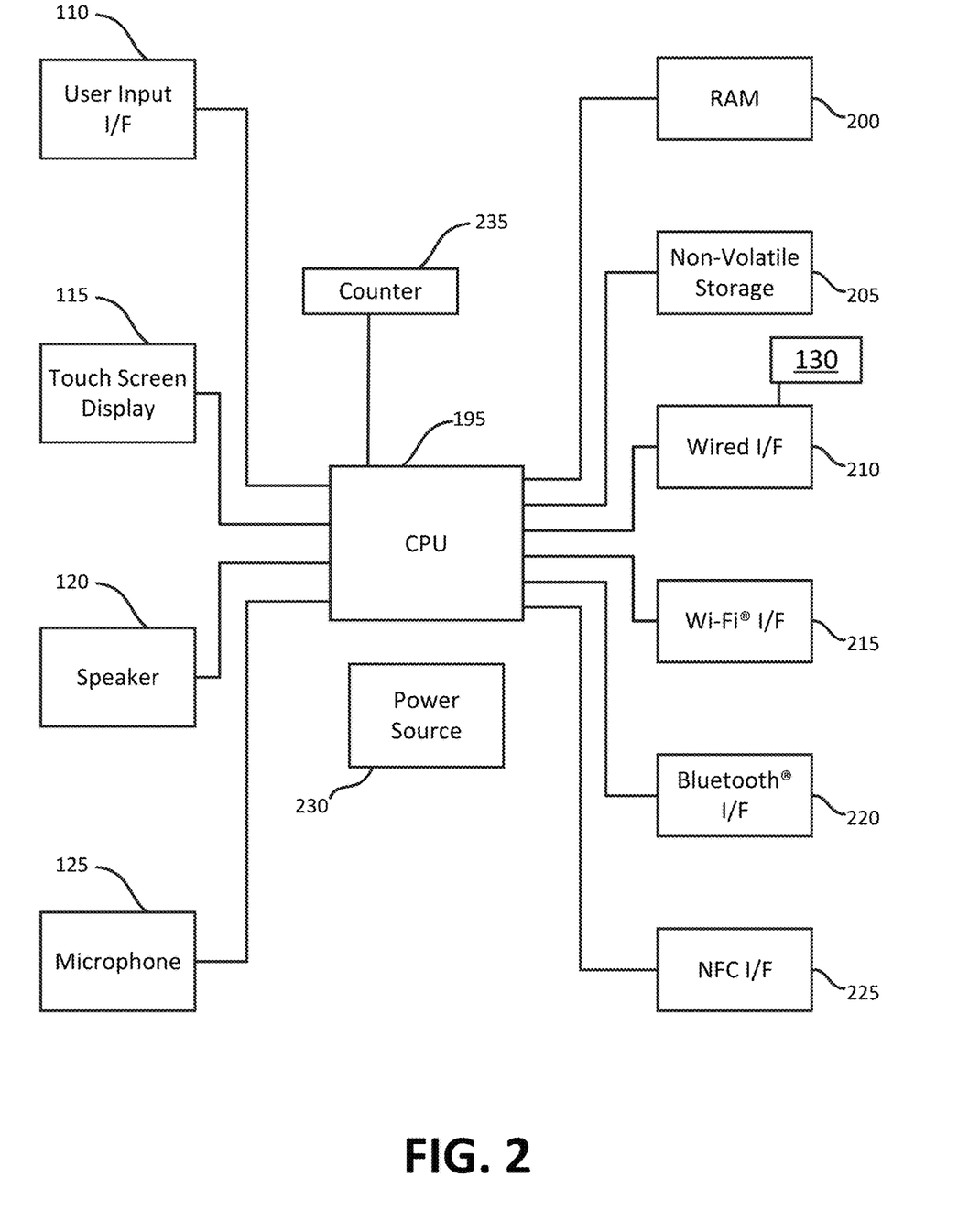
FIG. 2 shows a block diagram of the e-reader device according to a preferred embodiment of the invention.

FIG. 2 shows a block diagram of the e-reader device 100 according to a preferred embodiment of the invention. The e-reader device 100 includes the CPU 195 and a random access memory (RAM) 200 that stores a set of computer-readable instructions, such as operating system software and an interactive e-reading program. The CPU 195 executes the set of instructions of the interactive e-reading program to perform an interactive e-reading process, thereby providing an interactive user interface for the e-reader device 100 that allows a user to interact with the e-reader device 100.

The e-reader device 100 also includes non-volatile storage 205 that is used to store media content to be viewed and displayed on the touch screen display 115. The non-volatile storage 205 is preferably at least two gigabytes of flash storage, which provides for storage of approximately 1,100 electronic books. The non-volatile storage 205 may be implemented, however, as any suitable form of non-volatile storage media, including, but not limited to, solid state, magnetic, or optical storage, and may be implemented with any data storage size.

The e-reader device 100 further includes a wired interface 210, and various wireless interfaces, including a Wi-Fi® interface 215, a Bluetooth® interface 220, and a near-field communication (NFC) interface 225. The wired interface 210 is coupled to the interface port 130 located on the housing 110 of the e-reader device 100, and is preferably a universal serial bus (USB) or a micro-USB interface. The wired interface 210 and the corresponding interface port 130 may, however, utilize any available interface, and may even include two or more interfaces. In a preferred embodiment, the wired interface 210 connects the e-reader device 100 to a personal computer (PC) (unshown), via USB, to transfer media content from the PC to the e-reader device 100.

The Wi-Fi® interface 215 connects the e-reader device 100 to a wireless network for accessing a local area network (LAN) and/or a wide area network (WAN), such as the Internet. Of course, it is recognized that the e-reader device 100 may include additional wireless interfaces, and that any other wireless interface may likewise be integrated and used with the e-reader device 100.

The CPU 195 is connected to the user input I/F 110 and the touch screen display 115, and controls operation of the user input I/F 110 and the touch screen display 115. In a case that the user input I/F 110 includes the touch screen display 115, the CPU 195 receives corresponding touch input signals from the touch screen display 115. In addition, the CPU 195 is connected to the user input I/F 110, and receives input signals from the user input I/F 110 based on user actions on the touch screen display 115. Alternatively, the CPU may receive input signals from a user input I/F 110 that does not include the touch screen, and, instead, includes buttons, and/or other interface types. Furthermore, the CPU 195 is connected to the speaker 120 to output audio signals, and to the microphone 125 to receive audio signals, also referred to as commands.

The e-reader device 100 additionally includes a power source 230, such as a battery. In a preferred embodiment, the power source 230 is a rechargeable lithium-ion battery of sufficient capacity to power the e-reader device 100 for at least several hours. In addition, the e-reader device 100 may include a counter 235 that counts a time from when the user starts an e-book, for example, until the user completes the e-book. The counter 235 may also count a time from when the user starts a page of the e-book until the user completes the page of the e-book.

Figure 3:
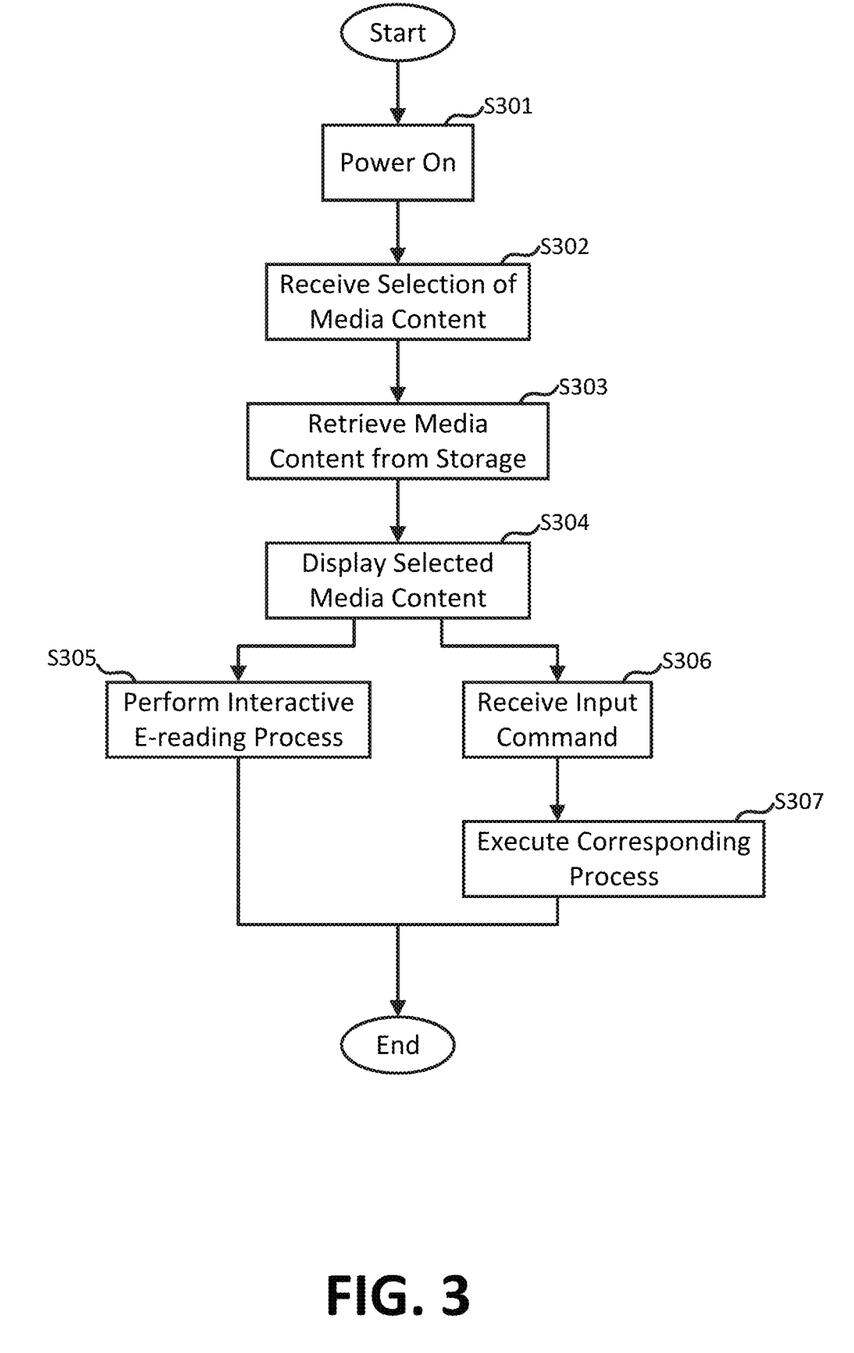
FIG. 3 illustrates a process performed in the e-reader device according to a preferred embodiment of the invention.

FIG. 3 illustrates a process performed in the e-reader device 100. In step S301, the e-reader device 100 is powered on via the on/off button 185. In step S302, the e-reader device 100 receives a selection of media content, such as an e-book, from a user via the user input I/F 110. In step S303, in response to the selection of media content, the CPU 195 retrieves the selected media content from the non-volatile storage 205. Alternatively, the CPU 195 may be connected to a server via one of the wired interface 210, or one of the various wireless interfaces, i.e., the Wi-Fi® interface 215, the Bluetooth® interface 220, and the NFC interface 225. In this case, the CPU 195 is configured to download an interactive e-reading program, including instructions for performing an interactive e-reading process described below, from the server, as well as media content, e.g., one or more e-books. Of course, it will be appreciated that the e-reading program and/or the media content may alternatively be pre-stored on the device.

In step S304, the CPU 195 causes the touch screen display 115 to display the selected media content. In step S305, the CPU 195 executes a set of instructions of the interactive e-reading process, as described below with reference to FIG. 4.

In step S306, the CPU 195 receives an input command from a user via the user input I/F 110. The input command via the user input I/F 110 may include one of a home command, when a user touches the home button 135, a library command, when a user touches the library button 140, a settings command, when a user touches the settings button 145, a search command, when a user touches the search button 150, a previous page command, when a user touches the previous page button 155, a repeat command, when the user touches the repeat button 160, a next page command, when a user touches a next page button 165, a volume up command, when a user touches the volume up button 170, a volume down command, when a user touches the volume down button 175, a mute command, when a user touches the mute button 180, and a power on or a power off command, when the user touches the power on/off button 185. The input command may also be the selection of an object, such as a word or an object on the screen, selected via the touchpad 190.

In response to receiving one of the commands described above, in step S307, the CPU 195 executes a corresponding process. That is, in response to the home command, the CPU 195 causes the touch screen display 115 to display a home screen, and, in response to the library command, the CPU 195 causes the touch screen display 115 to display a library screen that shows a list of the media content stored on the non-volatile storage 205. The library screen is not limited in showing a list of media content, and may display icons, or another suitable graphic display that shows a user the media content stored in the non-volatile storage. In response to receiving the settings command, the CPU 195 causes the touch screen display 115 to display a settings screen, in which a user can select and change or update various settings, such as selection and connection to a Wi-Fi® network, for example. In response to receiving the search command, the CPU 195 causes the touch screen display 115 to display a keyboard, such as a QWERTY keyboard, and a search field in which the user can enter characters, using the keyboard, to search for media content. When the user begins entering (i.e., typing) characters in the search field, the CPU 195 retrieves media content stored in the non-volatile storage 205 that matches the entered characters. Alternatively, it will be appreciated that the search command may utilize speech recognition functions, as described in more detail below, for receiving input of search parameters. For example, the media content may be stored with a file name, such as a title of an e-book. When the user enters characters corresponding to a portion of or all of the title of one or more e-books, or other media content, the CPU 195 retrieves those one or more e-books, or other media content, and displays a list containing the one or more e-books, or other media content, on the touch screen display 115. When the user selects an e-book from the displayed list, the CPU 195 displays the selected e-book (i.e., the selected media content) on the touch screen display 115.

In response to receiving the previous page command, the CPU 195 causes the touch screen display 115 to display a previous page of pages of the media content, i.e., a previous page of the e-book, when the media content is being displayed on the touch screen display 115. Similarly, in response to receiving the next page command, the CPU 195 causes the touch screen display 115 to display a next page of pages of the media content, i.e., a next page of the e-book, when the media content is being displayed on the touch screen display 115.

As will be described in more detail below, if the media includes one or more audio files, the CPU 195 outputs a corresponding audio signal via the speaker 120. For example, if the media content is an e-book, and, for a particular page of the e-book that is displayed on the touch screen display 115, the media content includes a corresponding audio file that outputs a voice recording, such as a voice recording of the word "ball," the CPU 195 outputs the audio file via the speaker 120. In response to receiving the repeat comment, the CPU 195 repeats the most recently output audio file via the speaker 120. In addition, the CPU 195 may be configured to output the audio file via the speaker 120 only if the page of the e-book to which the audio file corresponds is being displayed on the touch screen display 115.

In response to receiving the volume up command, the CPU 195 causes the volume of the audio output by the speaker 120 to increase. In response to receiving the volume down command, the CPU 195 causes the volume of the audio output by the speaker 120 to decrease. In response to receiving the mute command, the CPU 195 causes the speaker 120 to not output audio.

If the e-reader device 100 is off, in response to the power on command, the CPU 195 begins the processing described above with reference to FIG. 3, and the e-reader device is powered on. If the e-reader device 100 is on, in response to the power off command, the CPU 195 ends all processing and the e-reader device 100 turns off. Once the CPU 195 has performed the corresponding process, in response to receiving one of the above-described commands, the process ends.

Figure 7:
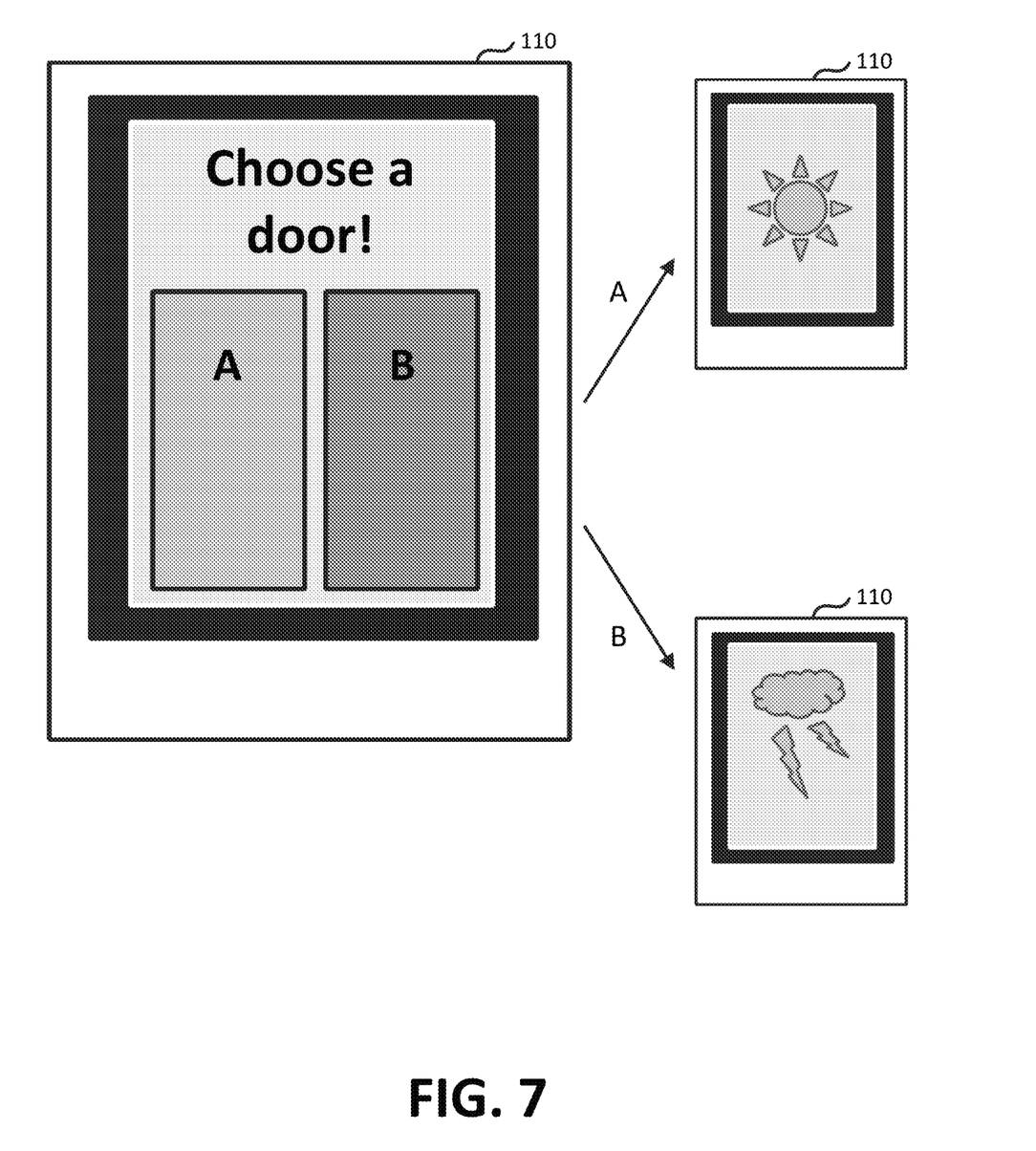
FIG. 7 shows an example of a display showing a user two objects that lead to two different subsequent pages.

In response to receiving selection of an object via the touchpad 190, the CPU 195 may display an animation or different text on the touch screen display 115. In one embodiment, when two or more objects, e.g., door A and door B, are displayed on the touch screen display 115, and the user selects one of the two or more objects, the CPU 195 proceeds to a subsequent page of the media content, as shown in FIG. 7. On the other hand, when the two or more objects are displayed on the touch screen display 115, and the user selects another one of the two or more objects, the CPU 195 proceeds to another subsequent page of the media content, as shown in FIG. 7. In this embodiment, the user can thus change the course of the story in the e-book.

In the flow chart shown in FIG. 3, steps S306 and S307 are shown separately from step S305. Steps 306 and S307 can, however, be performed during the performance of step S305, or as a part of step S305.

Figure 4:
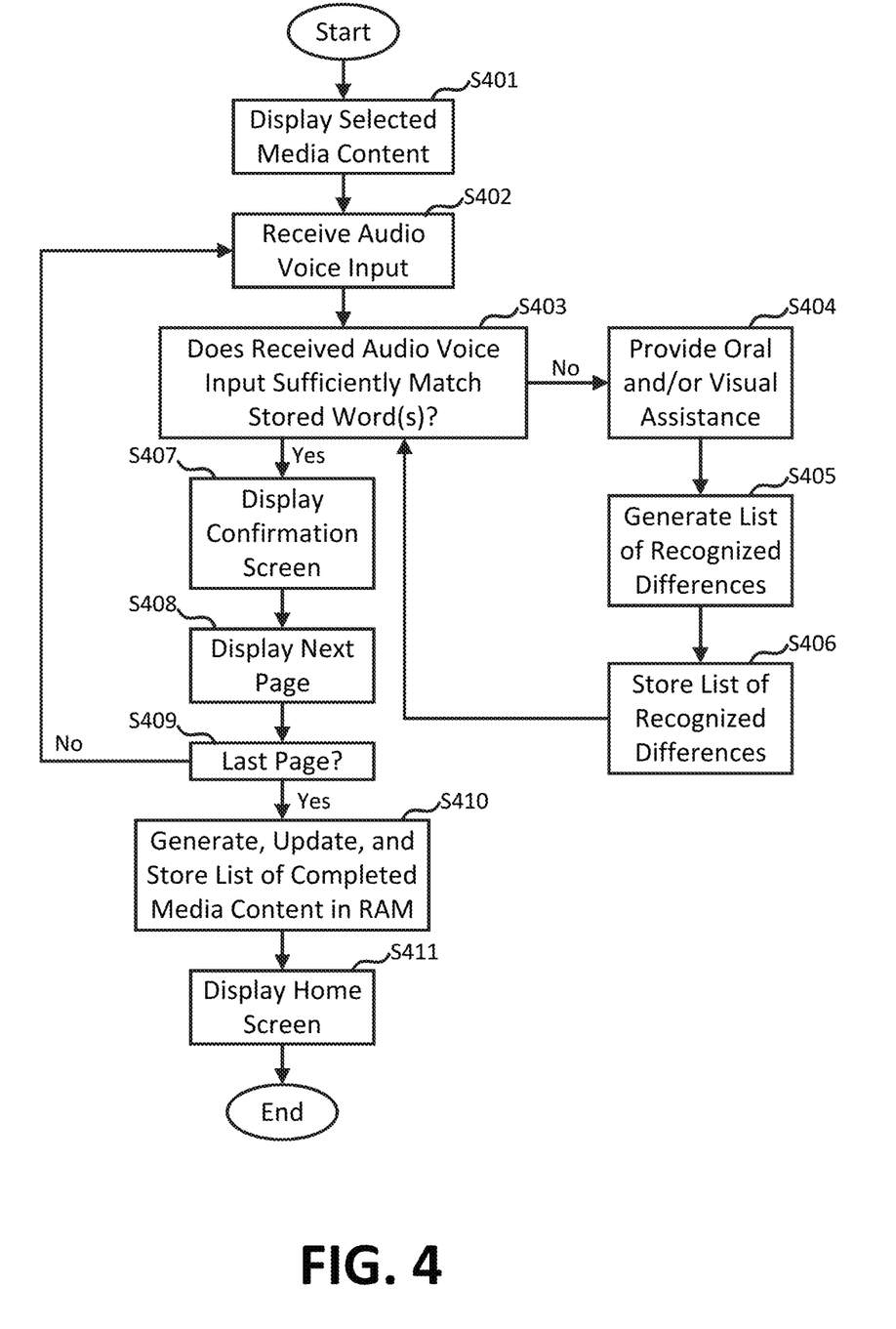
FIG. 4 shows an interactive e-reading process performed in the e-reader device according to a preferred embodiment of the invention.

The interactive e-reading process will now be described with reference to FIG. 4.

In step S401, the CPU 190 causes the touch screen display 115 to display the selected media content, e.g., an e-book. More specifically, the touch screen display 115 displays a first page, among a plurality of pages of the e-book. Alternatively, the display 100 may display any page of the plurality of pages of the e-book. The page of the e-book may include one or more of text, illustrations, audio files, and animations.

In step S402, the CPU 195 receives an audio voice input via the microphone 125. The audio voice input may include a word, a phrase, or a full sentence spoken aloud by the user.

In step S403, the CPU 195 compares the received audio voice input with one or more commands stored for the displayed page of the media content. More specifically, the CPU 195 determines whether the audio voice input is a sufficient phonetic match to the one or more stored words, i.e., whether the audio voice input and the one or more stored words is a "match". The match between the audio voice input and the one or more stored words does not need to be an exact match. For example, the CPU 195 may require at least an 80% match between the audio voice input and the one or more stored words in order to determine a match. Alternatively, the CPU 195 may require at least a 50% match to determine the match. Of course, the 50% and 80% percentage thresholds are simply examples, and any appropriate percentage threshold value may be used for determining a match between the received audio voice input and the stored word. In this manner, the CPU 195 executes a speech recognition process to recognize a word, a phrase, or a full sentence within the received audio voice input, and compares the recognized word, phrase, or full sentence with the one or more stored words to determine whether there is a match. The speech recognition process used in the e-reader device 100 is programmed to work uniformly, despite differences in accents or dialects. Alternatively, the CPU 195 may detect pronunciation of syllables within the audio voice input and compared the detected pronunciation with that of the stored word. The stored words may also be referred to as trigger words.

If the received audio voice input is not sufficiently similar to the stored word, because, for example, the audio voice input is less than 80% similar or less than 50% similar to the stored word, in step S404, the CPU 195 provides audio and/or visual assistance. More specifically, the CPU 195 may provide audio assistance by outputting an audio signal that includes a voice recording of the stored word. The CPU 195 may also provide visual assistance by causing the touch screen display 115 to display the stored word, or to display an animation that emphasizes portions of the word, phrase, or full sentence displayed on the page. By emphasizing portions of the word, phrase, or full sentence, the e-reader device 100 can guide a user on sounding out the displayed word, phrase, or full sentence, respectively. That is, the visual assistance may include displaying text of the word as separated groups, i.e., in consonant and/or vowel groups, blends, or sequences, and may include animating those separated groups sequentially, by, for example, increasing the size of the text of the separated groups on the touch screen display 115, or by highlighting or changing the color of the text of the separated groups on the display.

Alternatively, the audio and visual assistance may be combined. That is, in addition to displaying the word, phrase, or full sentence corresponding to the stored word, either as a singular word or in consonant and/or vowel groups, blends, or sequences, the CPU 195 also outputs an audio signal that includes the voice recording including the correct pronunciation of the word or the consonant and/or vowel groups, blends, or sequences.

In addition, if received audio voice input does not match the stored word, in step S405, the CPU 195 generates a list of recognized differences between the received audio voice input and the stored word, determined in the comparison of step S403. In step S406, the CPU 195 stores the list of recognized differences in the RAM 200. The recognized differences may be categorized into groups based on the particular type of difference. For example, if a user is having difficulty pronouncing a particular sound, the received audio voice input will not match the stored word. The CPU 195 recognizes the difference for each instance that the received audio voice input does not match the stored word having that particular sound. Then, the CPU 195 returns to step S403, and, if the CPU 195 receives the audio voice input that matches the stored word, the CPU 195 proceeds to step S407.

That is, if the received audio voice input matches one of the one or more stored words, in step S407, the CPU 195 displays a confirmation screen indicating the sufficient phonetic match. The confirmation screen may include one or a combination of text, illustrations, animations, and sounds added to the page of media content being displayed, or may comprise an entirely new page that displays text accompanied by one or more of illustrations, animations, and sounds.

Figure 8A:
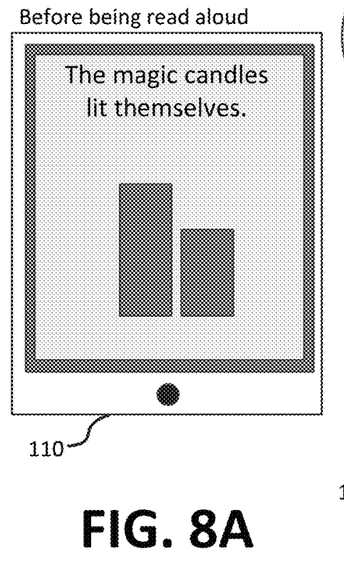
FIGS. 8A to 8C show an example of an interaction between the e-reader device and a user.

For example, as shown in FIG. 8A, the page of media content being displayed may include the text "the magic candles lit themselves," as well as an image of two candles.

Figure 8B:
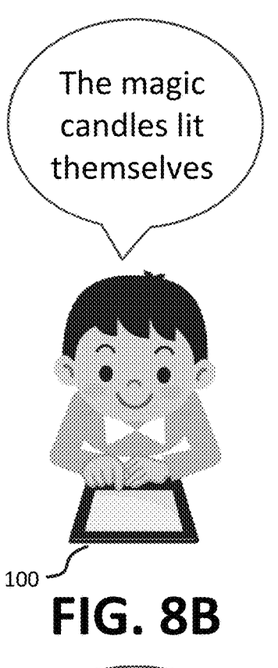
Figure 8C:
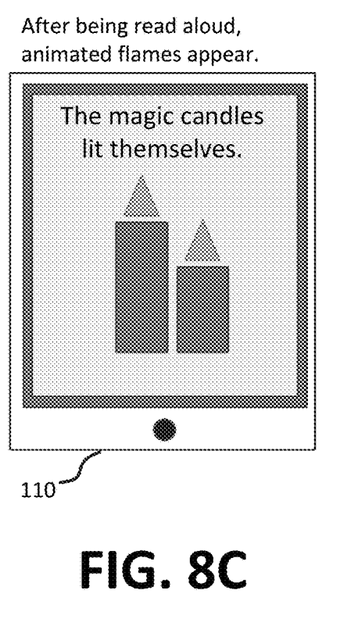

The CPU 195 stores the word "lit" as a stored word in the non-volatile storage 205 in association with the page of media content being displayed. In FIG. 8B, a user inputs the audio voice input by speaking aloud "the magic candles lit themselves." The e-reader device 100 receives the input audio voice input from the user, and, when the CPU 195 recognizes that the input audio voice input includes a word, here, "lit," that matches the stored word, the CPU 195 causes the display to add animated flames to the page, as shown in FIG. 8C. Alternatively, the CPU 195 stores the full sentence "the magic candles lit themselves" as the stored word in the non-volatile storage 205 in association with the page of media content being displayed.

As another example, if the page of media content being displayed shows the word "ball," and the word "ball," is the stored word, upon receiving "ball" as the audio voice input, the CPU 195 causes the touch screen display 115 to display a ball on the page, either as an illustration or an animation. The ball may be accompanied by audio of a ball bouncing. Alternatively, upon receipt of an audio voice input in which the word "ball" is correctly pronounced, the CPU 195 may cause the touch screen display 115 to display an animation in which the word "ball" on the page transforms into a ball (i.e., the word displayed turns into the object described by the word). As yet another example, when the word "hair" is displayed on a page, upon receiving an audio voice input in which the word "hair" is correctly pronounced, the CPU 195 may cause the touch screen display 115 to display an animation in which the word "hair" shown in the display sprouts hairs.

Figure 9A:
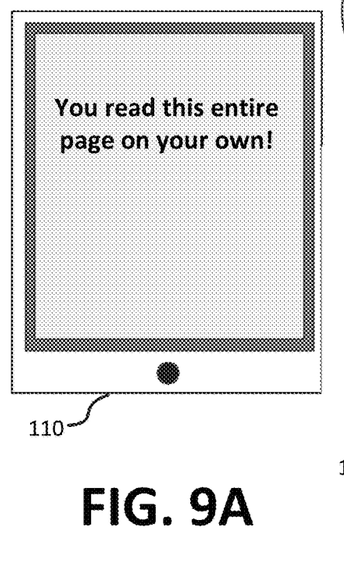
FIGS. 9A to 9C show another example of an interaction between the e-reader device and a user.
Figure 9B:
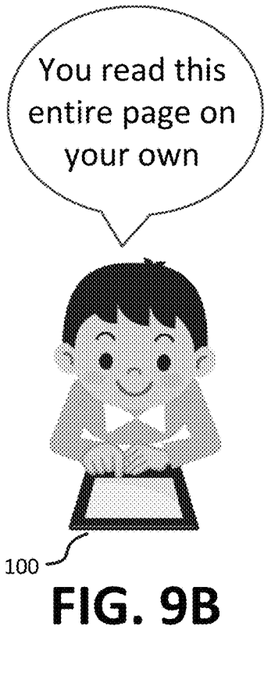
Figure 9C:
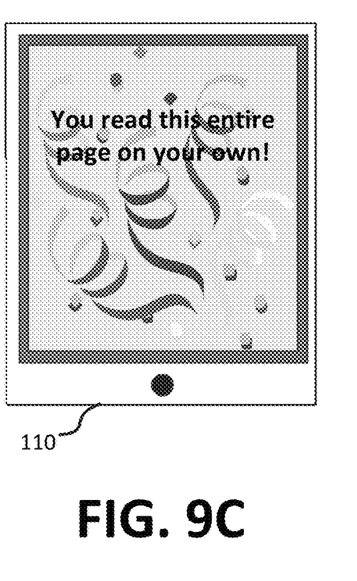

As still another example, if the user completes, or correctly pronounces, each word of a command stored in association with a page of media content being displayed, a new page may be displayed showing the text "you read this entire page on your own!", as shown in FIG. 9A. Then, when the user inputs an audio voice input correctly pronouncing "you read this entire page on your own!", as shown in FIG. 9B, the CPU 195 may cause the touch screen display 115 to show an animation, such as confetti streaming across the page, as shown in FIG. 9C.

Following step S407, or if the user inputs the next page command via the user input I/F 110, in step S408, the CPU 195 proceeds to the next page of media content. In step S409, the CPU 195 determines whether the last page of the media content is displayed. If the last page is not displayed, the CPU 195 returns to step S402 and repeats steps S402 to S409, as appropriate, until the user reaches the last page of the media content. When the user reaches the last page of the media content, in step S410, the CPU 195 generates, updates, and stores the media content in a list in the RAM 200, the list including media content "completed" (i.e., read) by the user. Then, the CPU 195 returns to one of the home screen, or, alternatively, to the library screen, in step S411.

Figure 5:
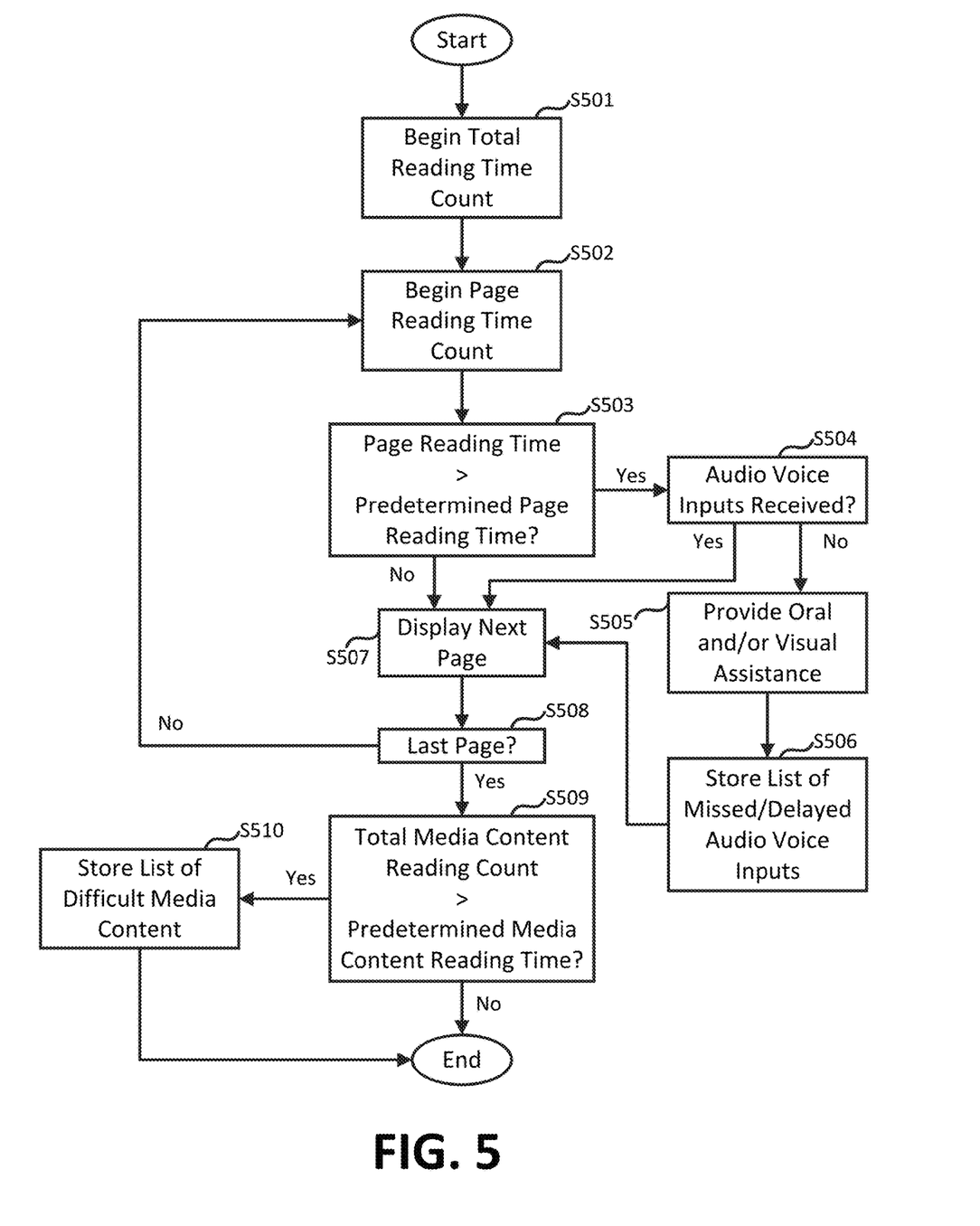
FIG. 5 shows a count process performed in the e-reader device according to a preferred embodiment of the invention.

In one embodiment, in step S401, when the selected media content is initially loaded by the CPU 195 and displayed on the touch screen display 115, the CPU 195 performs a count process, as shown in FIG. 5. In step S501, the counter 235 begins counting the time during which the touch screen display 115 displays the selected media content. In addition, in step S502, the counter 235 begins counting the time during which the touch screen display 115 displays a particular page of the selected media content. In step S503, the CPU 195 determines whether the page reading time counted by the counter 235 exceeds a predetermined page reading time. If yes in step S503, in step S504, the CPU 195 determines whether audio voice inputs have been received for the stored word(s) corresponding to the page being displayed on the touch screen display 115. If the CPU 195 has not received the audio voice inputs, in step S504, the CPU 195 determines that the user is having difficulty, for example, sounding out a word corresponding to the stored word. The CPU 195 then provides one or both of audio and visual assistance, as described above with regard to step S404, in step S505. The CPU 195 also stores the word corresponding to the stored word in a list stored on the RAM 200, the list including words, phrases, and sentences that the user is having difficulty completing within the predetermined page reading time, in step S506. The predetermined page reading time may be a constant value for all pages, or the predetermined page reading time may be different for each page.

If the CPU 195 receives the audio voice inputs corresponding to the stored word(s) corresponding to the page being displayed on the display, in step S507, the CPU 195 proceeds to the next page. Similarly, if the page reading time counted by the counter 235 does not exceed the predetermined page reading time, as determined in step S503, the CPU 195 displays the next page on the touch screen display 115. The CPU 195 then determines if the page for which the count process was performed is the last page in step S508. If the page was not the last page, the process returns to step S502, thereby restarting the page reading time count for the next page. If the page was the last page, in step S509, the CPU 195 determines whether the total media content reading count exceeds a predetermined media content reading count. If the total media content reading time exceeds the predetermined media content reading count, the CPU 195, in step S510, updates and stores a list in the RAM 200, to include the media content that the user is having difficulty completing within the predetermined media content reading time, and ends the process. If the total media content reading time does not exceed the predetermined media content reading count, the CPU 195 ends the count process.

In another embodiment, as noted above, a user may choose one object of two or more objects displayed on the touch screen display 115. This embodiment is described with reference to FIG. 6, and only those portions of the embodiment that differ from the embodiment shown in FIG. 4 are described.

Figure 6:
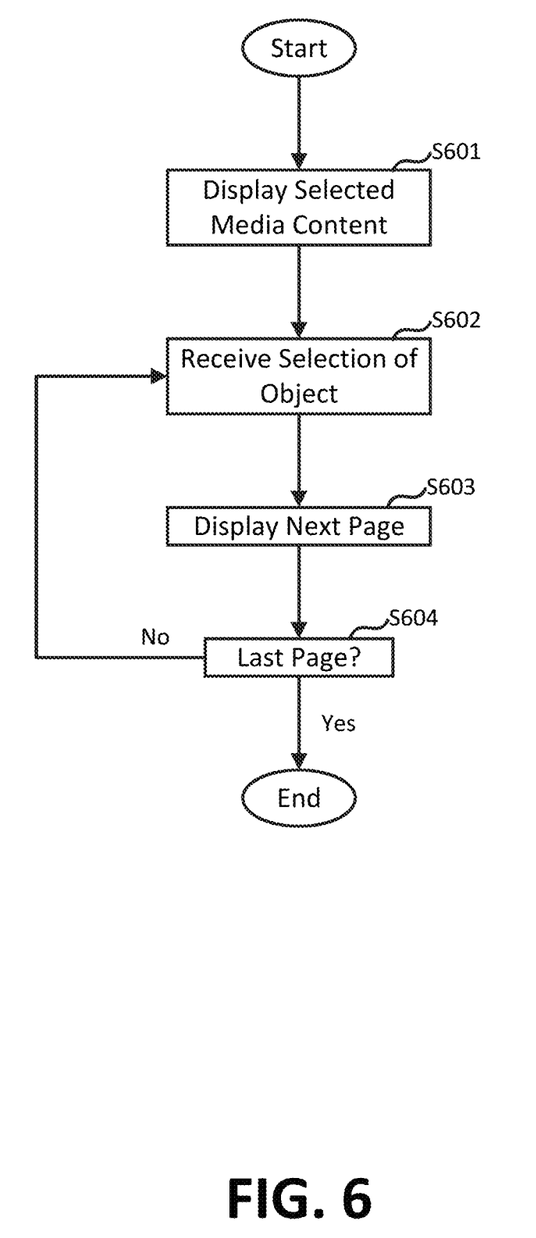
FIG. 6 shows a selection process performed in the e-reader device according to an alternative embodiment of the invention.

In this embodiment, as shown in FIG. 6, in step S601, similar to step S401, the CPU 195 causes the touch screen display 115 to display the selected media content, e.g., an e-book. More specifically, the touch screen display 115 displays a first page, among a plurality of pages of the e-book. Alternatively, the display 100 may display any page of the plurality of pages of the e-book. The page of the e-book includes two or more objects. The CPU 195 receives a selection of one of the two or more objects, in step S602. Then, in step S603, the CPU 195 proceeds to a subsequent page of the media content corresponding to the selected object. In this embodiment, the user can thus change the course of the story in the e-book. Alternatively, the user may input an audio voice input by speaking aloud a word or a phrase corresponding to one or the other object. In such a case, the CPU 195 uses the speech recognition technology to process the input audio voice input and proceed to the corresponding subsequent page in step S603. Then, in step S604, the CPU 195 determines whether the next page is a last page of the media content. If the next page is not the last page, the process returns to step S602. On the other hand, if the next page is the last page, the process ends.

In the case in which the CPU 195 is connected to the server, via either the wired I/F 210 or one of the wireless interfaces, including the Wi-Fi® I/F 215, the Bluetooth® I/F 220, or the NFC I/F 225, the CPU 195 is also capable of uploading information, including, for example, the list of recognized differences between the received audio voice input and the stored word, the list including media content "completed" (i.e., read) by the user, the list including words, phrases, and sentences that the user is having difficulty completing within the predetermined page reading time, and the list including media content that the user is having difficulty completing within the predetermined media content reading time, described above, to the server. The CPU 195 may also generate a profile for the user, and may store the lists noted above in association with the user's profile on the RAM 200 or may upload the lists noted above in association with the user's profile to the server. The CPU 195 can also download the user's profile, and the associated lists noted above, as well as media content that may be purchased by the user from an electronic book store (e-book store), to the e-reader device 100.

As described above, the interactive e-reading program including a set of instructions for performing the interactive e-reading process may be stored in the RAM 200. Alternatively, the interactive e-reading program may be stored remotely, for example, in the server. In such a case, the CPU 195 is configured to download the interactive e-reading program from the server. The interactive e-reading program may be in the form of an application (i.e., an app) that can be purchased from an electronic application store for use in the e-reader device 100.

As described above, in step S403, the CPU 195 compares the received audio voice input with one or more commands stored for a displayed page of media content, the commands and the displayed page of media content being retrieved from the RAM 200. Alternatively, the CPU 195 may retrieve the media content, including the pages and the association commands, from the server. In addition, the CPU 195 may transmit the received audio voice input to the server, and step S403 may be performed remotely such that the server returns a comparison result to the CPU 195.

The e-reader device 100 shown in FIG. 1, and described herein, may be in the form of a handheld tablet. The e-reader device 100 is not, however, limited to a handheld tablet, and may be a part of a kiosk, i.e., mounted in or on a fixed stand located in a shopping mall, a library, a retail shop, etc. as, for instance, a floor-standing or wall-mounted unit.

By virtue of the present invention, a user of an e-reader device 100 serves as the catalyst of the progression of a story in an e-book. Further, the e-reader device 100 of the present invention allows a user to read an e-book while experiencing sound and animations during the reading experience, in a manner that maintains emphasis on reading and that uses sound and animations as a reward for the user correctly pronouncing the stored words.

While preferred embodiments of the present invention have been described herein, these embodiments are provided for illustrative purposes only, and are not intended to limit the scope of the invention. Although specific configurations, structures, and processes have been shown and described, the invention is not limited to such configurations, structures, and processes. Modifications and variations are contemplated within the scope of the invention, which is to be limited only by the scope of the issued claims.

I claim:

1. A device comprising:
   (A) a housing;
   (B) a display including a display screen;
   (C) a user input interface;
   (D) a speaker;
   (E) a microphone;
   (F) at least one memory that stores instructions and media content; and
   (G) at least one processor that, when executing the instructions stored in the at least one memory, is configured to:
      (a) display a list, including the media content stored in the at least one memory, on the display screen, wherein the media content includes an electronic book including one or more of text, illustrations, animations, and audio;
      (b) receive, from a user, a selection of media content from the displayed list of media content;
      (c) retrieve the selected media content from the at least one memory upon receipt of the selection from the user;
      (d) display the selected media content on the display screen as one or more pages of the media content;
      (e) receive, from the user, an input command via the user input interface;
      (f) execute a command in response to receiving the input command from the user; and
      (g) perform an interaction with the user that includes:
         (i) receiving an audio voice input from the user via the microphone;
         (ii) processing the received audio voice input, including determining whether the received audio voice input sufficiently phonetically matches with one or more stored words associated with the page of the media content being displayed on the display screen;
         (iii) controlling, if the received audio voice input does not sufficiently phonetically match the one or more stored words associated with the page being displayed on the display screen, at least one of:
            (1) the speaker to emit audio that provides audio assistance to the user, wherein the controlling of the speaker includes transmitting an audio signal, as a part of the one or more stored words, to the speaker to emit the audio, the audio signal including a stored or rendered voice clip corresponding to one of a word, a phrase, and a full sentence depicted on the page being displayed on the display screen, and
            (2) the display screen to display a screen that provides visual assistance to the user; and
         (iv) controlling, if the received audio voice input does sufficiently phonetically match the one or more stored words associated with the page being displayed on the display screen, the display screen to display a screen indicating the sufficient phonetic match.

2. A non-transitory computer-readable storage medium storing a program that, when executed by at least one processor in a device, performs a method comprising:
   (A) displaying, on a display screen of the device, a list, including media content stored in at least one memory of the device, wherein the media content includes an electronic book including one or more of text, illustrations, animations, and audio;
   (B) receiving, via a user input interface of the device, a selection of media content from the displayed list of media content;
   (C) retrieving the selected media content from the at least one memory upon receipt of the selection from the user;

(D) displaying the selected media content on the display screen as one or more pages of the media content;
(E) receiving, from the user, an input command via the user input interface;
(F) executing a command in response to receiving the input command from the user; and
(G) performing an interaction with the user that includes:
 (a) receiving an audio voice input from the user via a microphone of the device;
 (b) processing the received audio voice input, including determining whether the received audio voice input sufficiently phonetically matches with one or more stored words associated with the page of the media content being displayed on the display screen;
 (c) controlling, if the received audio voice input does not sufficiently phonetically match the one or more stored words associated with the page being displayed on the display screen, at least one of
  (i) the speaker to emit audio that provides audio assistance to the user, wherein the controlling of the speaker includes transmitting an audio signal, as a part of the one or more stored words, to the speaker to emit the audio, the audio signal including a stored or rendered voice clip corresponding to one of a word, a phrase, and a full sentence depicted on the page being displayed on the display screen, and
  (ii) the display screen to display a screen that provides visual assistance to the user; and
 (d) controlling, if the received audio voice input does sufficiently phonetically match the one or more stored words associated with the page being displayed on the display screen, the display screen to display a screen indicating the sufficient phonetic match.

3. The non-transitory computer-readable storage medium according to claim 2, wherein the interaction with the user further includes:
 (e) generating, if the received audio voice input does not sufficiently phonetically match the one or more stored words associated with the page being displayed on the display screen, a list of recognized differences between the received audio voice input and the one or more stored words associated with the page being displayed on the display screen; and
 (f) storing the list of recognized differences in the at least one memory.

4. The non-transitory computer-readable storage medium according to claim 2, wherein the method further comprises:
 (H) determining, after displaying the screen indicating the sufficient phonetic match, whether the page being displayed on the display screen is a last page of the electronic book; and
 (I) displaying, if it is determined that the page is the last page, a home screen including the media content available to the user.

5. The non-transitory computer-readable storage medium according to claim 2, wherein the one or more stored words associated with the page being displayed on the display screen is one of a word, a phrase, and a full sentence, and wherein the determining of whether the received audio voice input sufficiently phonetically matches the one or more stored words is performed by determining whether the received audio voice input is sufficiently phonetically similar to the entirety of the one of the word, the phrase, and the full sentence.

6. The non-transitory computer-readable storage medium according to claim 5, wherein the screen indicating the sufficient phonetic match includes include one or a combination of text, illustrations, animations, and sounds added to the page of media content being displayed on the display screen.

7. The non-transitory computer-readable storage medium according to claim 6, wherein the screen indicating the sufficient phonetic match includes an animation in which text that is displayed on the page being displayed on the display screen and that corresponds to the one or more stored words, transforms into a visual depiction corresponding to the one or more stored words.

8. The non-transitory computer-readable storage medium according to claim 2, wherein the screen indicating the sufficient phonetic match is a different page that displays text accompanied by one or more of illustrations, animations, and sounds.

9. The non-transitory computer-readable storage medium according to claim 2, wherein, in determining whether the received audio voice input sufficiently phonetically matches with one or more stored words associated with the page being displayed on the display screen, the at least one processor determines whether an amount of the match meets or exceeds a threshold value.

10. The non-transitory computer-readable storage medium according to claim 2, wherein the controlling of the display screen to display a screen that provides the visual assistance to the user includes displaying an animation on the page being displayed on the display screen, the page depicting one of a word, a phrase, and a full sentence, the animation including one or more of:
 (i) separating the depicted one of the word, the phrase, and the full sentence into portions;
 (ii) increasing a size one or more of the separate portions of the one of the word, the phrase, and the full sentence; and
 (iii) changing a color one or more of the separate portions of the one of the word, the phrase, and the full sentence.

11. A method comprising:
(A) displaying, on a display screen of a device, a list, including media content stored in at least one memory of the device, wherein the media content includes an electronic book including one or more of text, illustrations, animations, and audio;
(B) receiving, via a user input interface of the device, a selection of media content from the displayed list of media content;
(C) retrieving the selected media content from the at least one memory upon receipt of the selection from the user;
(D) displaying the selected media content on the display screen as one or more pages of the media content;
(E) receiving, from the user, an input command via the user input interface;
(F) executing a command in response to receiving the input command from the user; and
(G) performing an interaction with the user that includes:
 (a) receiving an audio voice input from the user via a microphone of the device;
 (b) processing the received audio voice input, including determining whether the received audio voice input sufficiently phonetically matches with one or more stored words associated with the page of the media content being displayed on the display screen;
 (c) controlling, if the received audio voice input does not sufficiently phonetically match the one or more stored words associated with the page being displayed on the display screen, at least one of
(i) the speaker to emit audio that provides audio assistance to the user, wherein the controlling of the speaker includes transmitting an audio signal, as a part of the one or more stored words, to the speaker to emit the audio, the audio signal including a stored or rendered voice clip corresponding to one of a word, a phrase, and a full sentence depicted on the page being displayed on the display screen, and
(ii) the display screen to display a screen that provides visual assistance to the user; and
(d) controlling, if the received audio voice input does sufficiently phonetically match the one or more stored words associated with the page being displayed on the display screen, the display screen to display a screen indicating the sufficient phonetic match.

12. The method according to claim 11, wherein the interaction with the user further includes:
(e) generating, if the received audio voice input does not sufficiently phonetically match the one or more stored words associated with the page being displayed on the display screen, a list of recognized differences between the received audio voice input and the one or more stored words associated with the page being displayed on the display screen; and
(f) storing the list of recognized differences in the at least one memory.

13. A method comprising:
(A) displaying, on a display screen of a device, a list, including media content stored in at least one memory of the device, wherein the media content includes an electronic book including one or more of text, illustrations, animations, and audio;
(B) receiving, via a user input interface of the device, a selection of media content from the displayed list of media content;
(C) retrieving the selected media content from the at least one memory upon receipt of the selection from the user;
(D) displaying the selected media content on the display screen as one or more pages of the media content;
(E) receiving, from the user, an input command via the user input interface;
(F) executing a command in response to receiving the input command from the user; and
(G) performing an interaction with the user that includes:
(a) receiving an audio voice input from the user via a microphone of the device;
(b) processing the received audio voice input, including determining whether the received audio voice input sufficiently phonetically matches with one or more stored words associated with the page of the media content being displayed on the display screen;
(c) controlling, if the received audio voice input does not sufficiently phonetically match the one or more stored words associated with the page being displayed on the display screen, at least one of (i) the speaker to emit audio that provides audio assistance to the user, and (ii) the display screen to display a screen that provides visual assistance to the user; and
(d) controlling, if the received audio voice input does sufficiently phonetically match the one or more stored words associated with the page being displayed on the display screen, the display screen to display a screen indicating the sufficient phonetic match,
(H) determining, after displaying the screen indicating the sufficient phonetic match, whether the page being displayed on the display screen is a last page of the electronic book; and
(I) displaying, if it is determined that the page is the last page, a home screen including the media content available to the user.

14. The method according to claim 11, wherein the one or more stored words associated with the page being displayed on the display screen is one of a word, a phrase, and a full sentence, and
wherein the determining of whether the received audio voice input sufficiently phonetically matches the one or more stored words is performed by determining whether the received audio voice input is sufficiently phonetically similar to the entirety of the one of the word, the phrase, and the full sentence.

15. The method according to claim 14, wherein the screen indicating the sufficient phonetic match includes include one or a combination of text, illustrations, animations, and sounds added to the page of media content being displayed on the display screen.

16. A method comprising:
(A) displaying, on a display screen of a device, a list, including media content stored in at least one memory of the device, wherein the media content includes an electronic book including one or more of text, illustrations, animations, and audio;
(B) receiving, via a user input interface of the device, a selection of media content from the displayed list of media content;
(C) retrieving the selected media content from the at least one memory upon receipt of the selection from the user;
(D) displaying the selected media content on the display screen as one or more pages of the media content;
(E) receiving, from the user, an input command via the user input interface;
(F) executing a command in response to receiving the input command from the user; and
(G) performing an interaction with the user that includes:
(a) receiving an audio voice input from the user via a microphone of the device;
(b) processing the received audio voice input, including determining whether the received audio voice input sufficiently phonetically matches with one or more stored words associated with the page of the media content being displayed on the display screen;
(c) controlling, if the received audio voice input does not sufficiently phonetically match the one or more stored words associated with the page being displayed on the display screen, at least one of (i) the speaker to emit audio that provides audio assistance to the user, and (ii) the display screen to display a screen that provides visual assistance to the user; and
(d) controlling, if the received audio voice input does sufficiently phonetically match the one or more stored words associated with the page being displayed on the display screen, the display screen to display a screen indicating the sufficient phonetic match,
wherein the one or more stored words associated with the page being displayed on the display screen is one of a word, a phrase, and a full sentence, wherein the determining of whether the received audio voice input sufficiently phonetically matches the one or more stored words is performed by determining whether the received audio voice input is sufficiently phonetically similar to the entirety of the one of the word, the phrase, and the full sentence, wherein the screen indicating the sufficient phonetic match includes include one or a combination of text, illustrations, animations, and sounds added to the page of media content being displayed on the display screen, and wherein the screen indicating the sufficient phonetic match includes an animation in which text that is displayed on the page being displayed on the display screen and that corresponds to the one or more stored words, transforms into a visual depiction corresponding to the one or more stored words.

17. The method according to claim 11, wherein the screen indicating the sufficient phonetic match is a different page that displays text accompanied by one or more of illustrations, animations, and sounds.

18. The method according to claim 11, wherein, in determining whether the received audio voice input sufficiently phonetically matches with one or more stored words associated with the page being displayed on the display screen, the processor determines whether an amount of the match meets or exceeds a threshold value.

19. A method comprising:
(A) displaying, on a display screen of a device, a list, including media content stored in at least one memory of the device, wherein the media content includes an electronic book including one or more of text, illustrations, animations, and audio;
(B) receiving, via a user input interface of the device, a selection of media content from the displayed list of media content;
(C) retrieving the selected media content from the at least one memory upon receipt of the selection from the user;
(D) displaying the selected media content on the display screen as one or more pages of the media content;
(E) receiving, from the user, an input command via the user input interface;
(F) executing a command in response to receiving the input command from the user; and
(G) performing an interaction with the user that includes:
   (a) receiving an audio voice input from the user via a microphone of the device;
   (b) processing the received audio voice input, including determining whether the received audio voice input sufficiently phonetically matches with one or more stored words associated with the page of the media content being displayed on the display screen;
   (c) controlling, if the received audio voice input does not sufficiently phonetically match the one or more stored words associated with the page being displayed on the display screen, at least one of (i) the speaker to emit audio that provides audio assistance to the user, and (ii) the display screen to display a screen that provides visual assistance to the user; and
   (d) controlling, if the received audio voice input does sufficiently phonetically match the one or more stored words associated with the page being displayed on the display screen, the display screen to display a screen indicating the sufficient phonetic match,
wherein the controlling of the display screen to display a screen that provides the visual assistance to the user includes displaying an animation on the page being displayed on the display screen, the page depicting one of a word, a phrase, and a full sentence, the animation including one or more of:
(i) separating the depicted one of the word, the phrase, and the full sentence into portions;
(ii) increasing a size of one or more of the separate portions of the one of the word, the phrase, and the full sentence; and
(iii) changing a color of one or more of the separate portions of the one of the word, the phrase, and the full sentence.

* * * * *